(12) United States Patent
Ho et al.

(10) Patent No.: US 7,844,147 B2
(45) Date of Patent: Nov. 30, 2010

(54) DYNAMIC WAVEFORM SHAPING IN A CONTINUOUS FIBER

(75) Inventors: Yu Yeung Ho, Mississauga (CA); Li Qian, Toronto (CA)

(73) Assignee: Governing Council of the Univeristy of Toronto, Toronto, Ontario (CA)

( * ) Notice: Subject to any disclaimer, the term of this patent is extended or adjusted under 35 U.S.C. 154(b) by 0 days.

(21) Appl. No.: 12/424,159

(22) Filed: Apr. 15, 2009

(65) Prior Publication Data
US 2009/0257715 A1   Oct. 15, 2009

Related U.S. Application Data

(60) Provisional application No. 61/044,990, filed on Apr. 15, 2008.

(51) Int. Cl.
G02B 6/34    (2006.01)
G02B 6/00    (2006.01)
G02F 1/01    (2006.01)
G02F 1/035   (2006.01)

(52) U.S. Cl. ............... 385/37; 385/1; 385/2; 385/3; 385/11

(58) Field of Classification Search .......... 385/1–3, 385/11, 37
See application file for complete search history.

(56) References Cited

U.S. PATENT DOCUMENTS

| | | | |
|---|---|---|---|
| 5,754,321 A * | 5/1998 | Giles et al. ............. | 398/83 |
| 6,097,861 A * | 8/2000 | Kim et al. ............. | 385/27 |
| 6,640,024 B1 * | 10/2003 | Kim et al. ............. | 385/24 |
| 2003/0086647 A1 * | 5/2003 | Willner et al. ......... | 385/37 |

OTHER PUBLICATIONS

"Wavelength-spacing tunable multiwavelength erbium-doped fiber laser based on four-wave mixing of dispersion-shifted fiber," by Han et al, Optics Letters, vol. 31, No. 6, Mar. 2006, pp. 697-699.*

"Optical isolator/polarizer based on a rectangular wavegduie with helical grooves," by Shvets et al, Quantum Electronics and Laser Science Conference (QELS), Baltimore, Maryland, May 6, 2007, paper QMG4.*

"Fiber-Bragg-grating force sensor based on a wavelength-switching actively mode-locked erbium-doped fiber laser", by Liu et al, Applied Optics, vol. 44, No. 23, Aug 2005, pp. 4822-4829.*

(Continued)

*Primary Examiner*—Ryan Lepisto
*Assistant Examiner*—Robert Tavlykaev
(74) *Attorney, Agent, or Firm*—Ogilvy Renault LLP

(57) ABSTRACT

A system for dynamic waveform shaping in an optical fiber comprising: the optical fiber receiving an optical waveform, the optical waveform having individual spectral lines; a plurality of fiber bragg gratings in-line on the optical fiber, each having a reflectivity wavelength corresponding to one of the spectral lines; a plurality of polarization controllers in-line on the optical fiber, each polarization controller receiving the optical waveform from a respective fiber bragg grating; a circulator for directing the optical waveform as input to the plurality of fiber bragg gratings and receiving the optical waveform as output from the plurality of fiber bragg gratings; and a polarizer in-line on the optical fiber receiving the optical waveform from the fiber bragg gratings and the polarization controllers.

11 Claims, 5 Drawing Sheets

OTHER PUBLICATIONS

"Quadruple-wavelength actively mode-locked fiber laser with polarization-contolled wavelength switching," by Feng et al, Applied Optics, vol. 43, No. 34, Dec. 2004, pp. 6334-6338.*

"Switchable multi-wavelength erbium-doped fiber lasers by using cascaded fiber Bragg gratings written in high birefringence fiber," by Chun-Liu et al, Optics Communications, vol. 230, 2004, pp. 313-317.*

"Rectangular pulse generation based on pulse reshaping using a superstructured fiber Bragg grating," by Petropoulos et al, Journal of Lightwave Technology, vol. 19, No. 5, May 2001, pp. 746-752.*

* cited by examiner

DYNAMIC WAVEFORM SHAPING IN A CONTINUOUS FIBER

CROSS REFERENCE TO RELATED APPLICATIONS

The present disclosure claims priority from U.S. Application No. 61/044,990, filed Apr. 15, 2008.

FIELD OF THE INVENTION

The present disclosure is related to waveform shaping techniques. In particular, the present disclosure is related to dynamic waveform shaping techniques in an optical fiber.

BACKGROUND

Optical Arbitrary Waveform Generation (O-AWG) is a promising technology for generating high-bandwidth analog microwaves used in advanced radar systems and ultra-wideband communications systems. O-AWG utilizes waveform generation and shaping in the optical domain to overcome the speed limitation of electronics. By "arbitrary" is meant that any waveform of interest may be generated. The ability to dynamically change the waveforms in the field is of particular interest because it allows higher degree of freedom for optimization and control.

Techniques for dynamic pulse shaping in the optical domain can be generally divided into two categories: direct temporal shaping (such as that described in: Capmany et al., Journal of Lightwave Technology, 13, pp. 2003, 1995; Shen et al., IEEE Photonics Technology Letter, 16, pp. 1155, 2004) and temporal shaping through spectral manipulation (such as that described in: Weiner, Review of Scientific Instruments 71, 1929, 2000; Azana et al., Optics Letters 30, pp. 3228, 2005; Kaplin et al., in Ultrafast Optics IV: Selected Contributions to the 4th International Conference on Ultrafast Optics (Springer, 2004), pp. 105-118). The former utilizes multiple delays in time to sample and then manipulate the optical signal in time domain. The latter case typically uses free-space diffraction gratings (as described in Weiner), arrayed waveguide gratings (as described in: Yilmaz et al., IEEE Photonics Technology Letter, 14, pp. 1608, 2002), Fiber Bragg Gratings (as described in: Brennan III et al., U.S. Pat. No. 6,195,484), or dispersive fiber (as described in Azana et al.) to separate the frequency contents of a signal, and then use a Spatial Light Modulator (SLM) (as described in Weiner) or an Electro-optic Modulator (EOM) (as described in: Azana et al.; Brennan III et al.) to manipulate the spectral content of the signal. All these techniques, however, requires the light signal to couple out of fiber for spectral manipulation and then couple back into the fiber—the inherent loss is therefore high.

It would be desirable to provide a method for dynamic waveform shaping that addresses at least some of the above concerns.

SUMMARY

A dynamic waveform shaping system is disclosed, where the waveform shaping function may be carried out in a continuous, splice-free fiber. The disclosed system may provide a low-loss dynamic waveform shaping technique for high-repetition-rate signals by independent phase and amplitude control of spectral lines in a continuous fiber. The disclosed system may perform spectral line-by-line shaping by employing uniform Fiber Bragg Gratings (FBGS) to separate the spectral lines, and may provide independent amplitude and phase control for each line via in-line polarization controller and in-line fiber stretcher respectively.

In some aspects, there is provided a system for dynamic waveform shaping in an optical fiber comprising: the optical fiber receiving an optical waveform, the optical waveform having individual spectral lines; a plurality of fiber bragg gratings in-line on the optical fiber, each having a reflectivity wavelength corresponding to one of the spectral lines; a plurality of polarization controllers in-line on the optical fiber, each polarization controller receiving the optical waveform from a respective fiber bragg grating; and a polarizer in-line on the optical fiber receiving the optical waveform from the fiber bragg gratings and the polarization controllers. The system may also include a circulator or coupler for directing the optical waveform as input to the plurality of fiber bragg gratings and receiving the optical waveform as output from the plurality of fiber bragg gratings.

DETAILED DESCRIPTION

A system for dynamic waveform shaping is described. The operation of the system may be understood with regards to equation (1) provided below. An arbitrary periodic signal modulating a carrier at $\omega_0$ may be represented by a Fourier series with suitable amplitudes $a_m$ and phase relations $\phi_m$:

$$E(t) = \Sigma_{m=-\infty}^{m=\infty} |a_m| e^{jm2\pi ft + j\phi_m} e^{j\omega_0 t} \quad (1)$$

where f is the repetition rate of the periodic signal, which corresponds to the frequency separation of the discrete spectral lines in the Fourier series. Conversely, if one can independently control $a_m$ and $\phi_m$, one may generate arbitrary-shaped periodic signals.

This system may allow for dynamic waveform shaping or generation entirely in-fiber. This may address the problems of insertion loss caused by conventional out of fiber methods. This system may also allow for dynamic waveform shaping, which is typically not provided by in-fiber static techniques (such as that described in Berger et al., Journal of Lightwave Technology, 24, pp 2746-2751, 2006).

Figure 1:
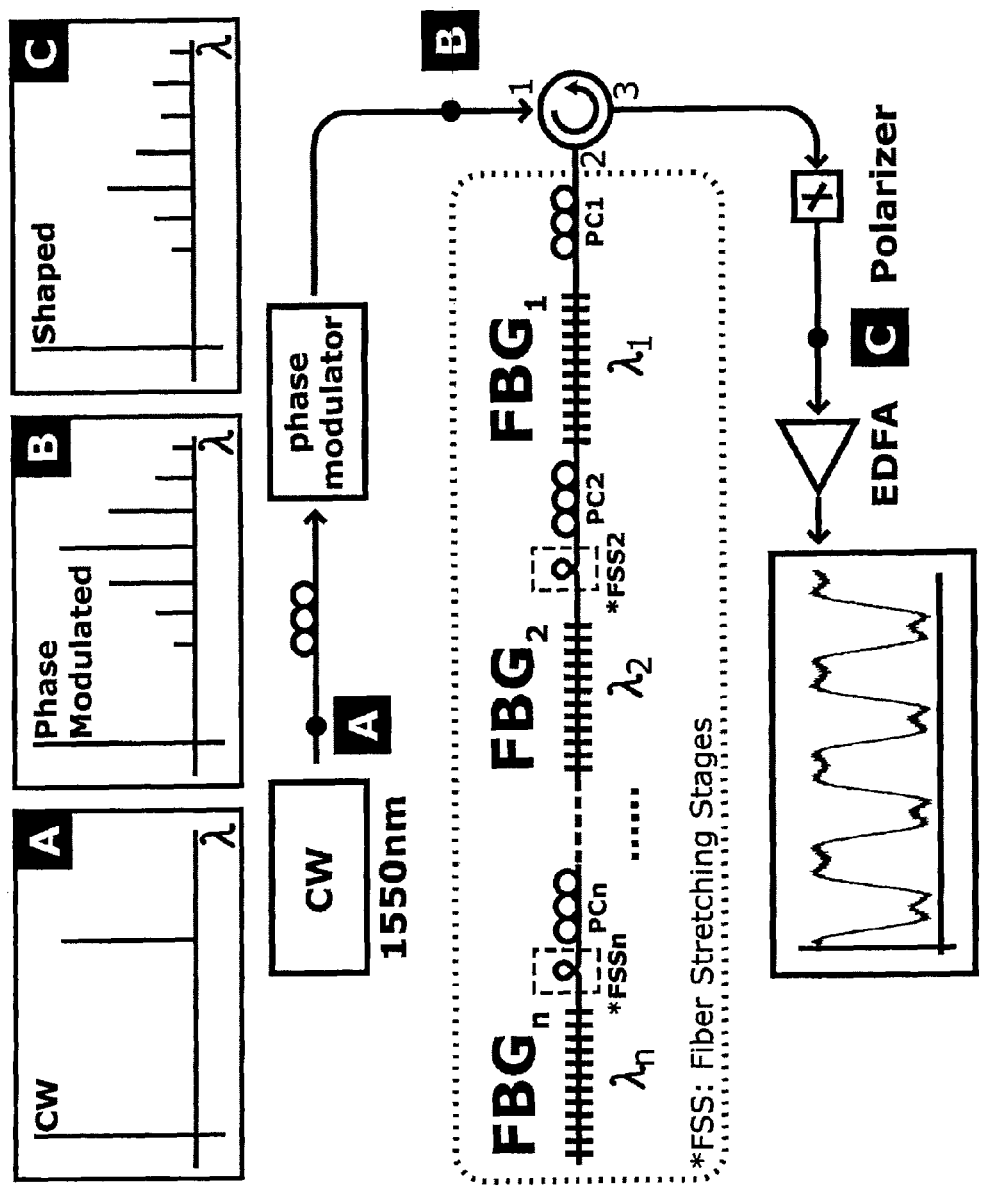
FIG. 1 is a schematic illustration of a system for dynamic waveform shaping.

Reference is now made to FIG. 1, which shows a schematic of an embodiment of the system. This system may provide all-fiber spectral line-by-line pulse shaping, and may incorporate FBGs, polarization controllers, and fiber stretchers. Plots A, B and C depict the signal spectra at points A, B and C of the system, respectively. The spectral lines of the signal ($\lambda_1, \lambda_2, \ldots, \lambda_n$) match the central wavelengths of the FBGs (FBG$_1$, FBG$_2$, ..., FBG$_n$).

The system may accept an optical waveform to be shaped. The system may receive the waveform from an external source, or the waveform source may be included in the system itself.

Figure 2B:
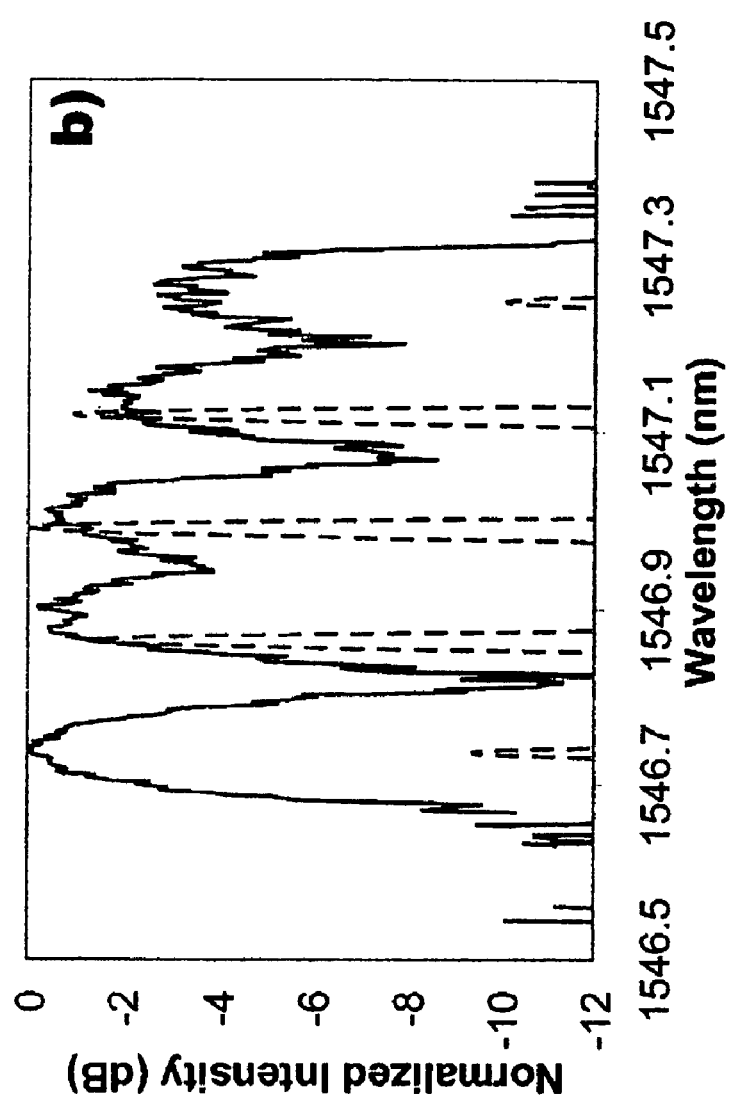
FIGS. 2A and 2B illustrate spectral responses of FBGs that may be used in a system for dynamic waveform shaping.
Figure 2A:
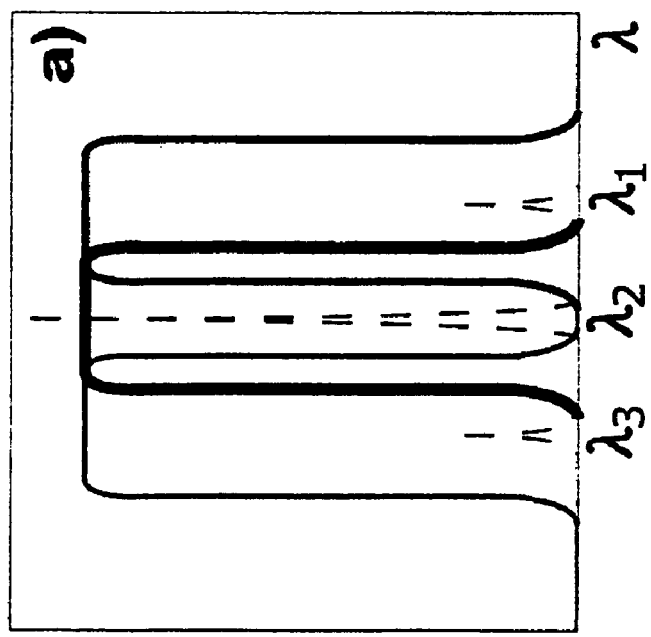

In an example, a continuous-wave (CW) laser may be used as the source of a carrier wave. The carrier wave may be phase modulated by a sinusoidal radiofrequency (RF) signal resulting in a number of sidebands, or spectral lines (as shown in inset B of FIG. 1). By sending the spectral lines through an array of uniform FBGs with high reflectivity, the spectral lines may be spatially separated. The center reflectivity wavelengths of the FBGs may be approximately spaced equally, matching the wavelengths of the spectral lines. FIGS. 2A and 2B illustrate a spectral response of FBGs that may be used with this system. FIG. 2A illustrates a preferred spectral response of a shaping system with a three-FBG array and FIG. 2B illustrates a spectral response of a fabricated five-FBG array (solid line), and the matching input spectrum (dotted line).

Either the FBGs or the RF signal may be tuned to match the spectral lines of the signal with the center reflectivity of the FBGs. In this example, the RF frequency may be tuned to match the spectral separation of the FBGs, and the wavelength of the CW laser may be tuned or selected to ensure each spectral line corresponds to the peak reflection wavelength of an FBG as shown in FIG. 2A. As an alternative to or in addition to tuning of the CW laser, the FBGs may also be tuned (such as described in Bélanger et al., Applied Optics, 47, pp 652-655, 2008). Hence, each FBG would only reflect one spectral line and thus spatially separating the lines for further manipulation. By tuning the spectral lines to match the center reflectivity of the FBGs, this approach may allow partial overlap of the FBG spectrum and thus may provide better spectral resolution and fabrication tolerance. Although in this example the spectral lines and reflectivity of the FBGs are matched, this is not a requirement for the system, so long as the spectral lines are each spatially separable by a respective FBG. In addition, unlike time-based pulse shaping, fabrication tolerance typically increases as repetition rate increases because the requirement for spectrum spacing between FBGs typically widens with repetition rate. Moreover, the FBGs may be simply used as frequency-dependent reflectors—neither the FBGs nor the spectral lines need to be tuned for dynamic pulse shaping, which may make the system more tolerant towards wavelength drifts due to environmental disturbances.

Unlike conventional static waveform generation techniques, this system may allow for dynamic amplitude manipulation of individual spectral lines through the combination of polarization controllers (PCs) and a polarizer rather than the reflectivity of the FBGs. In this system, the polarization controllers may be inserted between the FBGs and the polarizer may be placed at the output port (port 3) of the circulator as shown in FIG. 1. As each of the spectral lines passes through a different number of polarization controllers, each spectral line may be manipulated to have a different polarization state. Independent control of polarization for each line may be achieved, for example by adjusting the PCs in sequence (PC1, PC2, . . . then PCn). Thus, as the reflected spectral lines, which differ from each other in their polarization states due to the different number of polarization controllers, pass through the polarizer at the output, the amplitude of each spectral line may be changed depending on its polarization state, thus shaping the waveform.

Phase relationships between the spectral lines may also be modified by varying the optical path length between the FBGs, for example using phase shifters such as fiber stretchers. Fiber stretchers or phase shifters may be inserted after each FBG for this purpose. Pulse shaping is typically achievable at least as long as the phase relationships between the frequency lines are controllable over $2\pi$. Having both polarization controllers and phase shifters may allow for control of both the amplitude and the phase of the waveform. However, control of only the amplitude or only the phase may be sufficient, depending on the application, hence in some cases only the polarization controllers or only the phase shifters may be needed.

The optical waveform may then be passed to a waveform amplifier, such as an erbium doped fiber amplifier (EDFA), to amplify the signal. Other waveform manipulation common in the art may also be performed (e.g., noise reduction), and would be clear to those skilled in the art.

Since polarization controllers and fiber stretchers may be inserted between the FBGs without having to break the fiber, the dynamic waveform shaping system described above may retain light in a continuous, splice-free fiber, which may serve to lessen or minimize possible insertion loss.

This system may operate in the frequency domain and may be capable of shaping pulses at high repetition rates. Owing to its all-fiber configuration, this system may have an advantage over the free-space SLM systems in terms of insertion loss. Since the pulse shaping may be carried out in a continuous fiber, insertion loss may be lessened or minimized, and thus the system may be scaled up to control many spectral lines for higher temporal resolution and better shape control.

Physical disturbance or temperature variation on the fiber may introduce polarization and phase fluctuation to the waveform. Simply enclosing the FBGs might not be sufficient to stabilize the waveform. Sufficient stability may be achieved using an insulator material around the FBGs. The insulator material may additionally insulate the polarization controllers and/or the phase controllers. For better insulation and signal stability, the insulator material may insulate the entire system. A suitable insulator material may be a gel material, for example a gel material with a high specific heat constant, such as a water-based sodium polyacrylate gel.

EXAMPLE

As an example of the system described above, several distinct waveforms were experimentally demonstrated by manipulating 5 spectral lines with a spectral resolution of 0.12 nm and a temporal resolution of 17 ps. Better temporal resolution may be achieved by increasing the bandwidth through additional spectral lines.

In this example, five FBGs were fabricated on SMF-28 fibers. For the convenience of the example, the FBGs, polarization controllers and fiber stretchers were spliced or connected through FC/PC connectors, which introduced some loss as seen in the reflection spectrum of the entire system (as seen in FIG. 2B). However, this entire system may be manufactured in a single piece of fiber. The 3 dB bandwidth of each FBG is approximately 90 pm, and the centre-to-centre frequency separation of the FBGs is 0.12 nm, which corresponds to 16 GHz of modulation frequency on the CW signal, same as the fundamental repetition rate of the shaped signal. The total spectral bandwidth consisting of 5 spectral lines is 0.48 nm (60 GHz at 1550 nm) for the shaped signal. This bandwidth translates into a temporal resolution of approximately 17 ps, which may be compatible with the response time of most commercial fast photodiodes.

Figure 3:
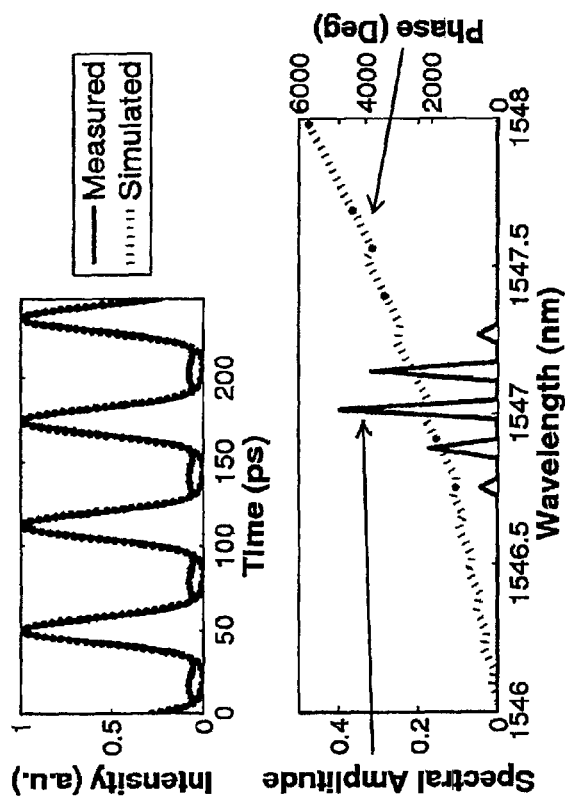
FIG. 3 shows waveforms generated from a system for dynamic waveform shaping.
Figure 3:
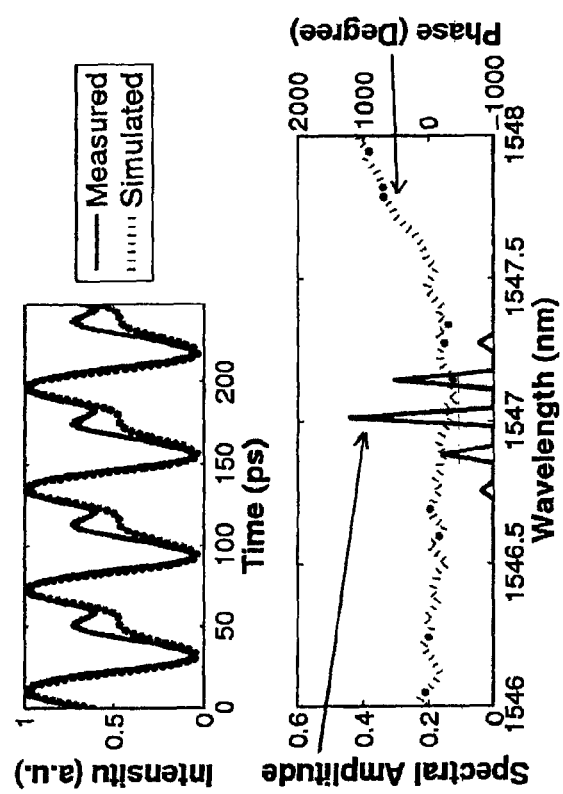

Reference is now made to FIG. 3, which shows experimental and simulated waveforms generated from the five-line all-fiber system in this example. FIG. 3 shows two different waveforms resulting from the same spectral amplitude, which demonstrates the independent control of phase in this example. FIG. 3 also shows the corresponding simulated intensity waveforms which is the square of E(t) in equation (1). The simulation uses the measured spectral amplitudes. The phase, on the other hand, is recovered from the Gerchberg-Saxton algorithm based on the measured temporal and spectral amplitudes. The small discrepancies between the measured and simulated waveforms may be due to the uncertainty in the measured spectral line amplitudes.

Figure 4:
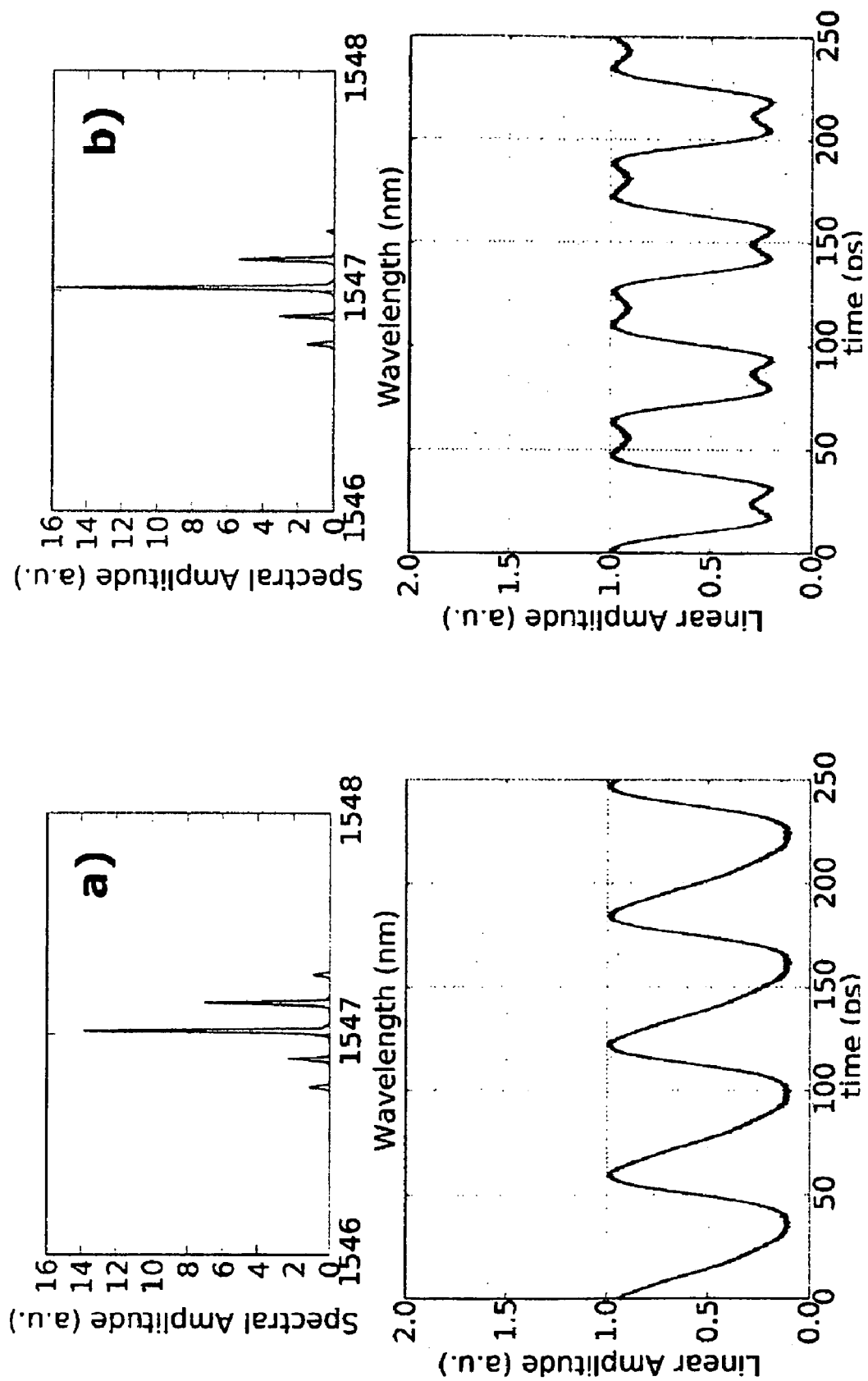
FIG. 4 shows other waveforms generated from a system for dynamic waveform shaping.

FIG. 4 shows samples of shaped pulse trains generated by the example system. Waveform a) has a temporal shape similar to a saw-tooth shape, and waveform b) shows a near "flat-top" temporal shape. It should be noted that because the bandwidth of the shaped signal (60 GHz) is similar to the bandwidth of the digital sampling scope (65 GHz) used to record these waveforms, some of the fast-varying temporal features in the shaped waveform may not be accurately reproduced by the scope and thus not accurately shown in this figure.

Figure 5:
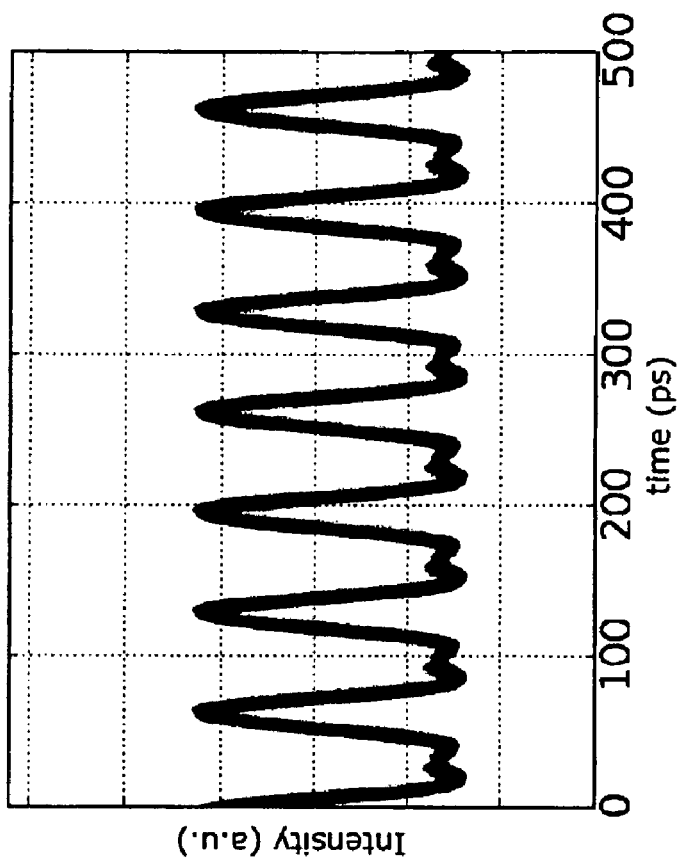
FIG. 5 shows scope persistence traces of waveforms generated from a system for dynamic waveform shaping.
Figure 5:
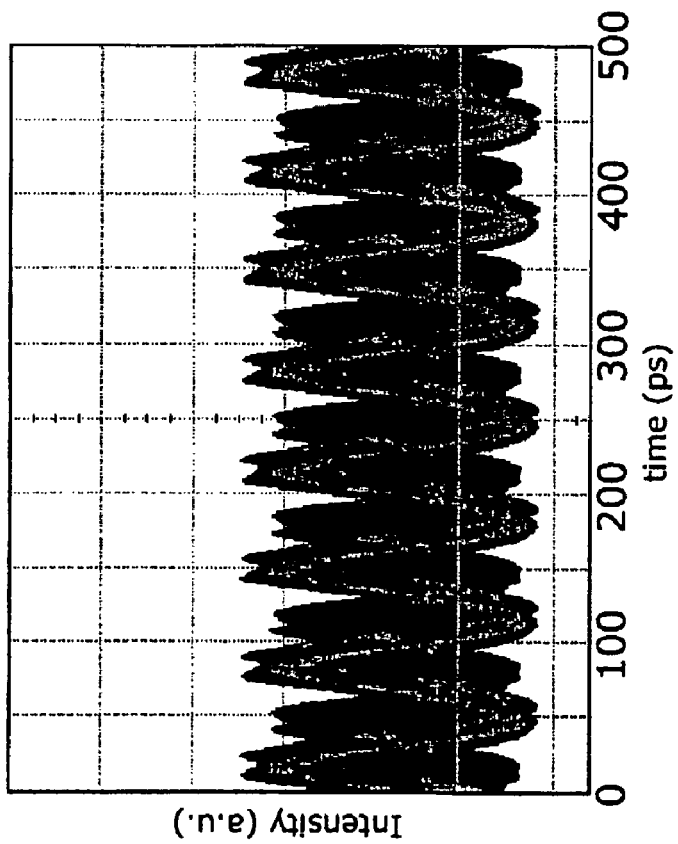

Waveform stability may be desirable in this system because physical disturbance and temperature variation on the fiber may introduce both polarization and phase fluctuation to the signal. Reference is now made to FIG. 5, which shows scope persistence traces of waveforms generated from a 3-line system with and without gel insulation. A simple enclosure may not effectively reduce instability, as shown in the left plot of FIG. 5. This plot illustrates the fluctuation of a generated waveform over 50 seconds. The right plot of FIG. 5 illustrates the decreased fluctuation of a generated waveform with gel insulation over 10 minutes. In the right plot, the fiber was insulated using water-based sodium polyacrylate gel to improve the system stability. Owing to the high specific heat of water (4.181 J/cm$^3$K), a dominant ingredient of the gel, the gel may effectively insulate the fiber from temperature fluctuation. In addition, the mechanical properties of the gel may help insulate the fiber from vibrational disturbances. More than 10 minutes of continuous stability was thus achievable without feedback control. The stable duration may allow sufficient time to implement a feedback control system to further improve the stability of the system.

The spectral resolution of the system may be limited by the slope of the FBG spectrum, which may be controlled to be within 100 pm/20 dB, giving a spectral resolution of 12.5 GHz. In this example the spectral resolution of the disclosed system may be comparable to that of the state-of-the-art SLM system, with the added advantage of low insertion loss. Considering scattering loss at the FBG and small loses at the PC, an estimated double-pass transmission loss of 0.1 dB per stage may be achieved. A 100-line system will therefore have a worst-case spectral line loss of 10 dB. This does not reflect the system total insertion loss, however, as this worst-case scenario only applies to the last reflected line. For example, for a 5 nm FWHM Gaussian input, a 100-line system with 0.1 nm spectral resolution would only produce loss of 4.64 dB. That is because the total insertion loss of the system may be dependent on the energy distribution of the input spectrum. Alternatively, one may use FBG tuning techniques to optimize the system such that the bulk of the energy may be reflected first and exploit the transmission loss as part of the amplitude controls.

Applications

The disclosed system may be useful in fiber lasers, such as for conversion of a CW laser to a pulse laser. This system may also be useful for RF waveform shaping or generation by converting shaped optical signals into electrical signals. This system may also be useful in micromachining applications by allowing optimization of energy transfer and by controlling thermal effects. This system may also provide coherent control for investigation of quantum dynamics of a chemical process, light-matter interaction, or physiochemical processes, among others.

Although the present disclosure refers to particular examples and embodiments, these are only for the purpose of illustration and are not intended to be limiting. A person skilled in the art would understand that variations and modifications are possible within the scope of this disclosure, including existing and future developments in technology. All referenced documents are hereby incorporated by reference in their entirety.

The invention claimed is:

1. A system for dynamic waveform shaping in an optical fiber comprising:
    the optical fiber receiving an optical waveform, the optical waveform having individual spectral lines;
    a plurality of fiber bragg gratings disposed in a serial in-line arrangement on the optical fiber, each having a reflectivity wavelength corresponding to one of the spectral lines and arranged to receive the optical waveform incoming from a first direction and reflecting at least a portion of the optical waveform in an opposing second direction;
    a plurality of polarization controllers disposed in a serial in-line arrangement on the optical fiber, each polarization controller receiving at least a portion of the optical waveform reflected by one or more of the fiber bragg gratings in the second direction;
    a circulator for directing the optical waveform as input to the plurality of fiber bragg gratings and receiving the optical waveform as output from the plurality of fiber bragg gratings; and
    a polarizer in-line on the optical fiber receiving the optical waveform from the fiber bragg gratings and the polarization controllers.

2. The system of claim 1 further comprising a plurality of phase shifters disposed in a serial in-line arrangement on the optical fiber, each phase shifter receiving at least a portion of the optical waveform reflected by one or more of the fiber bragg gratings in the second direction, each phase shifter receiving the optical waveform from or providing the optical waveform to a respective polarization controller.

3. The system of claim 1 further comprising a source providing the optical waveform to the optical fiber.

4. The system of claim 3 wherein the source comprises a continuous-wave source and a phase modulator.

5. The system of claim 1 further comprising a signal amplifier receiving the optical waveform from the polarizer.

6. The system of claim 1 wherein the plurality of fiber bragg gratings is insulated in an insulator material.

7. The system of claim 6 wherein the insulator material insulates the plurality of fiber bragg gratings and the plurality of polarization controllers.

8. The system of claim 6 wherein the insulator material is a thermal and vibrational insulator.

9. The system of claim 1 wherein the polarization controllers and the fiber bragg gratings are disposed in-line on the optical fiber in an alternating manner.

10. The system of claim 2 wherein the plurality of fiber bragg gratings, the plurality of polarization controllers and the plurality of phase shifters are insulated in an insulator material.

11. The system of claim 10 wherein the insulator material is a thermal and vibrational insulator.

* * * * *